(12) United States Patent
Schroeder et al.

(10) Patent No.: US 7,847,073 B2
(45) Date of Patent: Dec. 7, 2010

(54) METHOD FOR PRODUCING A LIQUID FORMULATION OF SALTS OF SULPHONIC-ACID AZO DYES

(75) Inventors: Gunter-Rudolf Schroeder, Mannheim (DE); Juergen Decker, Dudenhofen (DE); Helmut Reichelt, Neustadt (DE); Ingo Klopp, Weisenheim (DE); Armin Diefenbacher, Germersheim (DE); Hartwig Voss, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 985 days.

(21) Appl. No.: 11/569,263

(22) PCT Filed: May 18, 2005

(86) PCT No.: PCT/EP2005/005392

§ 371 (c)(1),
(2), (4) Date: Nov. 17, 2006

(87) PCT Pub. No.: WO2005/113681

PCT Pub. Date: Dec. 1, 2005

(65) Prior Publication Data

US 2007/0232795 A1  Oct. 4, 2007

(30) Foreign Application Priority Data

May 19, 2004 (DE) .................. 10 2004 025 443

(51) Int. Cl.
*C09B 41/00* (2006.01)
(52) U.S. Cl. .................. 534/582; 534/676; 534/679; 534/887
(58) Field of Classification Search .................. None
See application file for complete search history.

(56) References Cited

U.S. PATENT DOCUMENTS

| | | | |
|---|---|---|---|
| 4,400,321 A | 8/1983 | Linhart et al. | |
| 5,049,282 A | 9/1991 | Linder et al. | |
| 6,533,826 B1 | 3/2003 | Gessner et al. | |
| 6,719,906 B1 | 4/2004 | Malisz et al. | |
| 7,488,810 B2 * | 2/2009 | Schmitt et al. | 534/582 |
| 2003/0164475 A1 | 9/2003 | Malisz et al. | |
| 2005/0004362 A1 | 1/2005 | Huber et al. | |
| 2006/0052590 A1 | 3/2006 | Schmitt et al. | |

FOREIGN PATENT DOCUMENTS

| | | |
|---|---|---|
| AU | 2003288074 A1 | 5/2004 |
| DE | 46804 | 2/1889 |
| EP | 0 045 840 A1 | 2/1982 |
| EP | 0 421 916 A2 | 4/1991 |
| GB | 1 359 898 | 7/1974 |
| JP | 61-296069 | 12/1986 |
| WO | WO 01/32786 A1 | 5/2001 |
| WO | WO 01/90257 A2 | 11/2001 |
| WO | WO 03/040240 A1 | 5/2003 |
| WO | WO 2004/048478 A1 | 6/2004 |

OTHER PUBLICATIONS

Yu et al., "Nanofiltration Used for Desalination and Concentration in Dye Production", Desalination, 140(1), 97-100, 2001.*
Yang et al., "Concentration and Diafiltration of Aqueous Fluorescent Whitener Solution by Nanofiltration", Desalination, 150, 155-164, 2002.*
Xu et al., "Treating Dyeing Waste Water by Ceramic Membrane in Crossflow Microfiltration", Desalination, 149, 199-203, 2002.*
Weber et al., Characteristics and Application of New Ceramic Nanofiltration Membranes, Desalination, 157, 113-125, 2003.*
Sondhi, Rishi, "Ceramic Membranes: Applications and Benefits—From "A" to "Z"", Advances in Filtration and Separation Technology, 15, 576-584, 2002 (abstract).*

* cited by examiner

*Primary Examiner*—Fiona T Powers
(74) *Attorney, Agent, or Firm*—Oblon, Spivak, McClelland, Maier & Neustadt, L.L.P.

(57) ABSTRACT

A process for producing a liquid formulation of salts of sulfonated azo dyes by coupling an at least equimolar amount of diazotized aminoarylsulfonic acids I $$H_2N-Ar-SO_3H \quad (I),$$

where Ar is phenylene (which may be monosubstituted by sulfo) or naphthylene (which may be mono- or disubstituted by sulfo and/or monosubstituted by hydroxyl) onto the coupling product of an unsubstituted or methyl-substituted phenylenediamine with itself comprises dissolving the azo dye in a basic medium and then subjecting the solution to a nanofiltration.

18 Claims, No Drawings

METHOD FOR PRODUCING A LIQUID FORMULATION OF SALTS OF SULPHONIC-ACID AZO DYES

The present invention relates to a process for producing a liquid formulation of salts of sulfonated azo dyes.

Vesuvin and its coupling products such as C.I. Direct Brown 44 have been known since the beginning of dye chemistry. For instance, the Colour Index shows that C.I. Direct Brown 44 is obtained by formally coupling two parts of sulfanilic acid onto one part of vesuvin (Bismarck Brown C.I. 21000). The cited German patent 46804 teaches the reaction of vesuvin with sulfanilic acid. However, the product is contaminated with large amounts of vesuvin, which have to be removed by filtration. The dye is recovered from the aqueous solution by salting out. However, a dye obtained by salting out is not suitable for producing liquid formulations, since its salt burden is much too high. Moreover, such isolating steps are very costly and inconvenient.

JP 61 296 069 teaches preparing the lithium salt of Direct Brown 44 by starting from the sodium salt, precipitating the acid and then using lithium hydroxide to prepare the lithium salt.

Prior PCT application PCT/EP/03/12803 teaches the production of a liquid formulation of Direct Brown 44 starting from m-phenylenediamine without intervening isolation of the vesuvin, by isolating Direct Brown 44 in the acid form and then dissolving in aqueous bases.

All these prior art processes involve an intervening step wherein the dye is isolated as a solid in order that salt burden or impurities may be removed thereby. But it is commercially desired to avoid any processing as a solid, this generally requiring a filtration and hence also an efficiently filterable solid.

The present invention accordingly had for its object to provide a process which provides a storage-stable low-salt liquid formulation of the dyes as a result and avoids the intervening isolation of a solid.

We have found that this object is achieved by a process for producing a liquid formulation of salts of sulfonated azo dyes by coupling an at least equimolar amount of diazotized aminoarylsulfonic acids I

$$H_2N-Ar-SO_3 \quad (I)$$

where Ar is phenylene (which may be monosubstituted by sulfo) or naphthylene (which may be mono- or disubstituted by sulfo and/or monosubstituted by hydroxyl) onto the coupling product of an unsubstituted or methyl-substituted phenylenediamine with itself, which comprises dissolving the azo dye in a basic medium and then subjecting the solution to a nanofiltration.

The dyes are produced as solids under coupling conditions so that an aqueous suspension is obtained. "Dissolving in a basic medium" is to be understood as meaning that the azo dye is dissolved by basifying the pH of the reaction mixture, i.e., adjusting the pH of the reaction mixture to a value in the range from 8 to 14. This is preferably accomplished by metering the base to the aqueous reaction mixture. It is to be noted in this connection that process engineers generally prefer the addition of the base as an aqueous solution to the addition as a solid.

Useful bases have cations which as counter-ions keep the dyes in solution, such as aqueous solutions of lithium hydroxide, sodium hydroxide and potassium hydroxide. It is further possible to use nitrogenous bases such as ammoniacal water, substituted amines such as monoalkyl-, dialkyl- or trialkylamine, tetraalkylammonium or benzyl-trialkylammonium hydroxides or amines derived from nitrogenous five- or six-membered saturated heterocycles, such as pyrrolidine, piperidine, morpholine or piperazine or their N-monoalkyl- or N,N-dialkyl-substituted products. Alkyl here is to be understood in the general sense as meaning straight-chain or branched $C_1$-$C_{20}$-alkyl, which can be substituted by one or two hydroxyl groups and/or interrupted by one to four oxygen atoms in ether function.

It is preferable to dissolve the dye with aqueous sodium hydroxide solution and a nitrogenous base. Especially aqueous sodium hydroxide solution and, as nitrogenous base, ammoniacal water and substituted amines such as monoalkyl-, dialkyl- and trialkylamines are suitable, since these provide particularly stable liquid formulations. Alkyl here is to be understood in the general sense as meaning straight-chain or branched $C_1$-$C_{20}$-alkyl, which can be substituted by one or two hydroxyl groups and/or interrupted by one to four oxygen atoms in ether function. Especially aqueous sodium hydroxide solution in combination with ammoniacal water is preferred. Ammoniacal water is a 20-30% by weight solution of ammonia in water.

The ratio of aqueous sodium hydroxide solution to nitrogenous base specifically ammoniacal water is variable. The amount of aqueous sodium hydroxide solution used per mole of dye is generally in the range from 0.1-1.9 mol. The rest of the base required for dissolving the total amount of dye is the nitrogenous base, preferably ammoniacal water. In the case of a dye having two sulfo groups, the total amount of aqueous sodium hydroxide solution and nitrogenous base has to be somewhat more than 2 mol based on 1 mol of dye. Aqueous sodium hydroxide solution and nitrogenous base preferably ammonia, are used in a molar ratio which is preferably in the range from 0.1/1.9 to 1.9/01, more preferably 0.7/1.3 to 1.3/0.7 especially in the range from 0.9/1.1 to 1.1/0.9 and even more preferably substantially equimolar. The addition of aqueous sodium hydroxide solution and the nitrogenous base can take place separately or as a mixture or be a combination thereof. For economic reasons, the pH is chosen such that the dye is just completely dissolved.

The value to which the pH is adjusted is preferably in the range of 8.5-11, preferably 8.5-10.5 and especially 9-9.5. Higher values are technically perfectly possible, but too much nitrogenous base would then be removed by the nanofiltration, depending on the $pk_B$ value of the nitrogenous base, and this would be uneconomical.

The subsequent nanofiltration serves to desalt and if appropriate concentrate the dye solution. The preferred membranes utilized in the membrane separation unit employed according to the present invention are commercially available nanofiltration membranes having molecular weight cutoffs of 200 daltons to 2000 daltons and more preferably 200 daltons to 1000 daltons. Transmembrane pressures range from 1 to 50 bar at temperatures up to 100° C.

Higher transmembrane pressures generally lead to higher permeate fluxes. Higher temperatures lead in principle to higher permeate fluxes and therefore are preferred as long as the product does not decompose.

The membrane separation unit can utilize any membrane which is stable in the particular system under the requisite separating conditions. The separating layers of useful membranes can consist of organic polymers, ceramic, metal, carbon or combinations thereof, and have to be stable in the reaction medium and at the process temperature. For mechanical reasons, separating layers are generally supported by a single- or multi-layered porous substructure, which consists of the same material as the separating layer or else of at least one different material than the separating layer. Examples are separating layers of ceramic and substructures of metal, ceramic or carbon; separating layers of carbon and substructures of metal, ceramic or carbon; separating layers of polymer and substructures of polymer, metal, ceramic or ceramic on metal. Polymeric separating layers used include for example polysulfone, polyethersulfone, polydimethylsiloxane (PDMS), polyetheretherketone, polyamide and polyimide.

Particular preference is given to inorganic membranes, especially membranes having ceramic separating layers. Compared with membranes having polymeric separating layers, these membranes achieve better salt passage and higher permeate flux. Ceramic separating layers include for example $\alpha$-$Al_2O_3$, $ZrO_2$, $TiO_2$, SiC or mixed ceramic materials of construction.

It has now been found that membranes having ceramic separating layers are very useful for nanofiltration of anionic direct dyes and also cationic dyes. They are preferably employed for nanofiltration of anionic direct dyes. The utility of these membranes not only for anionic but also for cationic dyes is commercially very significant, since it distinctly enhances the flexibility of a plant and accordingly only one nanofiltration membrane is required for manufacturing different dyes.

The membranes are typically encased in pressure-resistant housings which permit separation between retentate (dye-rich residue) and permeate (dye-lean filtrate) at the pressure conditions required for separation. Membranes can be embodied in flat, tubular, multi-channel element, capillary or wound geometry, for which appropriate pressure housings which permit separation between retentate and permeate are available. Depending on area requirements, one membrane element can comprise plural channels. Moreover, plural of these elements can be combined in one housing to form a module. The cross-flow speed in the module varies with module geometry between 0.2 and 10 m/s. Typical values range from 0.2 to 0.4 m/s in the case of a wound geometry and from 1 to 6 m/s in the case of a tubular geometry.

Dissolving the dye in a basic medium generally produces a dye solution whose dye content is in the range from 3% to 10% by weight. Such a solution can be directly desalted (and if appropriate concentrated) by nanofiltration. When a concentrated dye solution is present, it can be advantageous to dilute the mixture with water to a 3-6% by weight dye solution in order that higher flux rates may be achieved at filtration to thereby increase the space-time yield.

A portion of the nanofiltration step is preferably carried out as a diafiltration. In diafiltration, the removed permeate is wholly or partly replaced by a suitable diafiltration medium. In the process of the present invention, the permeate is preferably replaced by an aqueous solution of a nitrogenous base in order that the pH may be kept constant. Astonishingly, despite the change in dye concentration and removal of nitrogenous base, the post-nanofiltration ratio of the sodium/ammonium cations will be equal to the pre-filtration ratio.

In a preferred version of the process according to the present invention, when total permeate quantity is equal to 1 to 10 times the amount of crude dye solution feed, the amount of inorganic salts (especially NaCl) is reduced to <2% by weight based on 100% pure dye.

Replacement of permeate in the diafiltration step may be done portionwise or continuously. To achieve good salt removal in the process of the present invention it is often advantageous first to concentrate by nanofiltration and then to do the diafiltration. If appropriate, the sequence of concentration and diafiltration can be repeated.

Useful diazo components I include aminoarylsulfonic acids such as o-, m- and p-aminobenzenesulfonic acids, 1-aminobenzene-3,5-disulfonic acid, 1-aminobenzene-2,4-disulfonic acid, 1-aminobenzene-2,5-disulfonic acid, 1-naphthylamine-2-sulfonic acid, 1-naphthylamine-3-sulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 1-naphthylamine-3,6-disulfonic acid, 1-naphthylamine-3,8-disulfonic acid, 1-naphthylamine-4,7-disulfonic acid, 1-amino-8-hydroxynaphthalene-4,6-disulfonic acid, 1-amino-8-hydroxynaphthalene-4-sulfonic acid, 1-amino-8-hydroxynaphthalene-3,6-disulfonic acid, 2-aminonaphthalene-1-sulfonic acid, 2-naphthylamine-5-sulfonic acid, 2-naphthylamine-6-sulfonic acid, 2-naphthylamine-7-sulfonic acid, 2-aminonaphthalene-8-sulfonic acid, 2-naphthylamine-1,5-disulfonic acid, 2-naphthylamine-3,6-disulfonic acid, 2-naphthylamine-4,8-disulfonic acid, 2-naphthylamine-5,7-disulfonic acid, 2-naphthylamine-6,8-disulfonic acid, 2-naphthylamine-3,6-disulfonic acid, 2-naphthylamine-5,7-disulfonic acid, 2-naphthylamine-3,6,8-trisulfonic acid, 2-amino-8-hydroxynaphthalene-6-sulfonic acid, 2-amino-5-hydroxynaphthalene-7-sulfonic acid, 2-amino-3-hydroxynaphthalene-6-sulfonic acid and 2-amino-5-hydroxynaphthalene-1,7-disulfonic acid.

Preference is given to aminoarylsulfonic acids where Ar is phenylene or naphthylene which may each be substituted by a sulfo group. Particular preference is given to o-, m- and p-aminobenzenesulfonic acids, especially sulfanilic acid (p-aminobenzenesulfonic acid).

Useful coupling components include the coupling products of an unsubstituted or methyl-substituted phenylenediamine with itself. These products are azo dye mixtures whose main component is a bisazo dye. Suitable coupling products are toluene-diamines such as 2,3-, 2,4-, 2,5- to 2,6- and also 3,4-toluenediamine and preferably 2,4-toluenediamine whose coupling product with itself is Basic Brown 4 (C.I.21010). Particular preference is given to vesuvin, the coupling product of m-phenylenediamine with itself.

The aminoarylsulfonic acids I are diazotized using customary diazotizing agents such as nitrous acid, which is formed from alkali metal nitrite under acidic conditions. Useful diazotizing agents further include nitrosylsulfuric acid and alkyl nitrite, especially neopentylglycol dinitrite.

After excess nitrite has been destroyed, for example with sulfamic acid, the reaction mixture comprising the diazonium salt is added to the generally aqueous solution of the coupling product of an unsubstituted or methyl-substituted phenylenediamine with itself. The coupling reaction is preferably carried out in the pH range from 4 to 8 and more preferably in the pH range from 5 to 6.

The pH for the coupling reaction is set using agents known to one skilled in the art. Useful bases include for example basic metal hydroxides such as aqueous sodium hydroxide solution, basic metal carbonates such as sodium carbonate, sodium bicarbonates, or sodium dihydrogenphosphates, amines such as ethanolamine or alkali metal salts of carboxylic acids such as sodium acetate, lithium acetate, potassium acetate, sodium formate, sodium propionate, sodium oxalate, sodium succinate, sodium glutamate, sodium adipate, sodium glycolate, sodium lactate, sodium malate, sodium citrate, sodium tartrate, sodium fumarate or sodium maleate.

The diazo components I may be used individually or in their mixtures. The use of mixtures gives rise to dye mixtures which comprise asymmetrically substituted dyes as well. A preferred version of the process does not utilize diazo component mixtures. Formally, a dimolar coupling of a diazo component I onto vesuvin will produce a symmetrical dye. In general, however, a mixture is obtained that includes the single, double, triple and quadruple coupling products.

The coupling reaction is generally carried out in the temperature range from 0 to 20° C. To complete the reaction, it is preferable to warm to temperatures in the range from 20 to 30° C.

The amount of diazo component used per 1 mol of coupling component is preferably in the range from 1 to 4 mol, more preferably in the range from 1.5 to 2.5 mol and especially in the range from 1.8 to 2.2 mol. This generally achieves a <10% by weight level in the product mixture of the coupling product of an unsubstituted or methyl-substituted phenylenediamine with itself.

Despite this low level of coupling product of an unsubstituted or methyl-substituted phenylenediamine with itself, what ought to have happened is that this coupling product will quickly foul the nanofiltration membrane, since its solubility in water is very poor under alkaline conditions. Surprisingly, this effect does not occur; instead, this coupling product is kept in solution. One possible explanation is that the reaction medium has a solubilizing influence.

In a particularly preferred version of the process according to the present invention, an unsubstituted or methyl-substituted phenylenediamine is coupled with itself and this coupling product is reacted without intervening isolation to form the sulfonated azo dye by coupling an at least equimolar amount of diazotized aminoarylsulfonic acid I onto it, dissolving the resulting dye in a basic medium and then performing a nanofiltration.

The coupling product of an unsubstituted or methyl-substituted phenylenediamine with itself, preferably vesuvin, is prepared in a generally known manner by formally tetrazotizing one of three parts of m-phenylenediamine and allowing the remaining two parts to couple. To this end, 3 mol of m-phenylenediamine are reacted with from 1.5 to 2.5 mol, and preferably from 1.8 to 2.2 mol of sodium nitrite under acidic conditions. Preference is given to a process in which the acid is metered over a prolonged period, for example from 30 to 60 and preferably from 40 to 50 minutes. To complete the reaction, the pH of the reaction mixture is adjusted to a value in the range from 2 to 4, and the reaction mixture is subsequently stirred for some time. The entire reaction to give vesuvin is carried out at from −5 to +25° C. and preferably at from 0 to 15° C. On completion of addition of nitrite, the reaction mixture is stirred for a period in the range from 0.5 to 4 hours. The reaction mixture can then have the diazonium salt of the aminoarylsulfonic acid 1 metered into it directly.

The process of the present invention provides sulfonated azo dye solutions which can be further used directly as a liquid formulation.

If desired, the dye solutions are admixed with solubilizing additives. Such additives include for example water-miscible organic solvents such as $C_1$-$C_4$-alkanols, for example methanol, ethanol, propanol, isopropanol, butanol, isobutanol, sec-butanol or tert-butanol, carboxamides, such as N,N-dimethylformamide or N,N-dimethyl-acetamide, ketones or keto alcohols, such as acetone, methyl ethyl ketone or 2-methyl-2-hydroxypentan-4-one, ethers, such as tetrahydrofuran or dioxane, mono-, oligo- or polyalkylene glycols or thioglycols having $C_2$-$C_6$-alkylene units, such as ethylene glycol, 1,2-propylene glycol or 1,3-propylene glycol, 1,2-butylene glycol, 1,4 butylene glycol, neopentylglycol, 1,6-hexanediol, diethylene glycol, triethylene glycol, dipropylene glycol, thiodiglycol, polyethylene glycol or polypropylene glycol, other polyols, such as glycerol or 1,2,6-hexanetriol, $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl or monoethyl ether, $C_1$-$C_4$-alkyl esters of polyhydric alcohols, γ-butyrolactone or dimethyl sulfoxide. Useful solubilizing additives further include lactams, such as caprolactam, 2-pyrrolidinone or N-methyl-2-pyrrolidinone, urea, cyclic ureas, such as 1,3-dimethylimidazolidin-2-one or 1,3-dimethylhexahydropyrimid-2-one and also polyacrylic acids, polyacrylic acid derivatives, polyvinylamides, polyvinyl acetates, polyvinyl alcohols, polyvinylpyrrolidones, polysiloxanes or copolymers of the respective monomers. It is similarly possible to use oligomers of ethylene oxide or of propylene oxide or derivatives of these oligomers.

Preferred solubilizing additives are ureas, mono-, di- or triethanolamine, caprolactam, mono-, di- or trialkylene glycols having $C_{2-5}$-alkylene units and/or oligo- and polyalkylene glycols having ethylene and/or propylene units and also their $C_1$-$C_4$-alkyl ethers and $C_1$-$C_4$-alkyl esters. Very particular preference is given to ethylene glycol, 1,2-propylene glycol, 1,3-propylene glycol, neopentylglycol, butyldiglycol, alkylpolyethylene glycols, (MW 200-500), ureas and caprolactam.

Preferred liquid formulations comprise essentially 15-30% by weight of sulfonated azo dyes (based on the dye without counterion)

0-30% by weight of solubilizing additives based on the total amount of the aqueous liquid formulation. Particular preference is given to liquid formulations which comprise essentially from 10% to 30% by weight of sulfonated azo dyes and from 1% to 30% by weight and preferably from 1% to 5% by weight of solubilizing additives specifically ethylene glycol, 1,2-propylene glycol, 1,3-propylene glycol, neopentylglycol, butyldiglycol, alkylpolyethylene glycols (MW 200-600), ureas and/or caprolactam.

The present invention's liquid formulations are notable for excellent stability in storage. The liquid formulations are useful inter alia for dyeing and printing cellulosic fiber materials such as wood-containing and wood-free paper materials.

The process according to the present invention provides ready-for-sale liquid formulations of sulfonated azo dyes that enable dyebaths to be prepared directly, simply by diluting with water. The liquid formulations have a low salt content. The process of the present invention obviates the isolation of solids and makes it possible to produce stable low-salt liquid formulations starting from an unsubstituted or methyl-substituted phenylenediamine or, in a preferred version, starting from m-phenylenediamine.

The examples which follow illustrate the invention. Parts are by weight, unless otherwise stated.

EXAMPLES

Synthesis Example 1 a) Preparation of Coupling Component (Vesuvin Solution)

A mixture of 1720 parts of water and 43.8 parts of hydrochloric acid (20% by weight) was admixed with 140.6 parts of m-phenylenediamine at a temperature of 15-25° C. and stirred for 30 nm n. Then 1390 parts of ice were added, and the temperature of the mixture should be <0° C. Thereafter, 75.2 parts of solid sodium nitrite were added a little at a time before stirring for a further 5 min. Then 394.3 parts of hydrochloric acid (20% by weight) were metered in over 40 to 50 min. During the addition, the temperature of the reaction mixture was maintained between 0 and 3° C. by addition of a total of 300 parts of ice. After stirring for a further 10 min at 3° C., the excess diazonium salt was fully reacted (coupled) by adding a total of 10.5 parts of m-phenylenediamine a little at a time. Thereafter, the pH was adjusted to pH 3 by addition of 67 parts of aqueous sodium hydroxide solution (25% by weight) before stirring at 3° C. for a further 60 min.

b) Preparation of the Diazo Component (Diazotized Sulfanilic Acid)

159.9 parts of sulfanilic acid were dissolved in a mixture of 1264 parts of water and 149.9 parts of aqueous sodium hydroxide solution (25% by weight). This was followed by the addition of 1400 parts of ice and 318.4 parts of sodium dinitrite solution (20% by weight). After addition, the temperature of the reaction mixture was between 0 and 5° C. At this temperature, 382.5 parts of hydrochloric acid (20% by weight) were added and, after 30 min, excess nitrite was destroyed with 0.8 part of sulfamic acid.

c) Coupling

The coupling-component suspension prepared as per prescription a) was warmed to 20° C. Then 28 parts of sodium acetate were added. Thereafter, the suspension of the diazo component was added at 20° C. over 90 min. During the metered addition, the pH of the reaction mixture was maintained at pH 5 by addition of a total of 306 parts of aqueous sodium hydroxide solution (25% by weight). The reaction mixture was stirred at room temperature overnight and then adjusted to pH 9.5 by addition of 32.2 parts of ammoniacal water (25% by weight $NH_3$ solution). A clarifying filtration was carried out (filtration residue <0.1% by weight) to leave 8180 parts of a crude dye solution which was used as starting material for membrane filtration.

Synthesis Example 2 a) Preparation of Coupling Component (Vesuvin Solution)

A mixture of 1720 parts of water and 43.8 parts of hydrochloric acid (20% by weight) was admixed with 140.6 parts of m-phenylenediamine at a temperature of 15-25° C. and stirred for 30 min. Then 1390 parts of ice were added, and the temperature of the mixture should be <0° C. Thereafter, 188 parts of sodium nitrite solution (40% by weight) were metered in before stirring for a further 5 min. Then 394.3 parts of hydrochloric acid (20% by weight) were metered in over 40 to 50 min. During the addition, the temperature of the reaction mixture was maintained between 0 and 3° C. by addition of a total of 300 parts of ice. After stirring for a further 10 min at 3° C., the excess diazonium salt was fully reacted (coupled) by adding a total of 10.5 parts of m-phenylenediamine a little at a time. Thereafter, the pH was adjusted to pH 3 by addition of 67 parts of aqueous sodium hydroxide solution (25% by weight) before stirring at 3° C. for a further 60 min.

b) Preparation of the Diazo Component (Diazotized Sulfanilic Acid)

A mixture of 1370 parts of ice, 382.5 parts of hydrochloric acid (20% by weight) and 4 parts of Emulan EL was admixed over 30 min at 0 to 3° C. with a solution of 159.9 parts of sulfanilic acid in 1264 parts of water, 149.9 parts of aqueous sodium hydroxide solution (25% by weight) and 318.4 parts of sodium nitrite (20% by weight) by vigorous stirring. About 5 min after completion of addition, the reaction mixture was warmed to 10° C. and stirred for a further 60 min. Excess nitrite was then destroyed by addition of about 1.5 parts of sulfamic acid in total.

c) Coupling

The coupling-component suspension prepared as per prescription a) was warmed to 20° C. Thereafter, the suspension of the diazo component was metered in over 90 min. During the metered addition, the pH of the reaction mixture was maintained at pH 5 by addition of a total of 204 parts of aqueous sodium hydroxide solution (25% by weight) and 43.4 parts of ammoniocal water (25% by weight) at pH 5. The reaction mixture was stirred at room temperature overnight and then adjusted to pH 9.5 by addition of 32.2 parts of ammoniacal water (25% by weight). A clarifying filtration was carried out (filtration residue <0.1% by weight) to leave 8180 parts of a crude dye solution which was used as starting material for membrane filtration.

Synthesis Example 3 a) Preparation of Coupling Component (Vesuvin Solution)

A mixture of 74 parts of formic acid (>99% by weight) and 160 parts of water was admixed with 577 parts of ice so that the temperature was about 0-5° C. This was followed by the concurrent metered addition, over 120 min, of a solution of 219.6 parts of m-phenylenediamine (m-PDA) in 400 parts of water and 192.2 parts acetic acid (>99% by weight) on the one hand and of 459.5 parts of a sodium nitrite solution (20% by weight) on the other. During the addition, the reaction mixture was vigorously stirred and maintained at a temperature between 10 and 15° C. by addition of a total of 1154 parts of ice. On completion of the addition the mixture was heated to 40° C. and stirred at 40° C. for 3 h. A clarifying filtration was carried out (filtration residue <0.3% by weight) to leave 3230 parts of a crude dye solution which served as starting material for membrane filtration, General Prescription for Nanofiltration A Nanofiltration examples 1-3 were carried out by filling a stirred pressure cell having an internal volume of about 30 ml with an as-synthesized solution of the respective dye. The stirred pressure cell was thermostated to the operating temperature of 40° C. in a water bath and subsequently pressurized with nitrogen to the operating pressure. Permeate is removed on the low-pressure side of the membrane. The free membrane surface area of the flat membranes placed in the stirred pressure cells was 3.8 $cm^2$. A fast-turning, freely suspended magnetic stirrer on the pressure side of the membrane (retentate side) ensured adequate mixing through. After the desired amount of permeate had been removed, the stirred pressure cell was let down and the retentate was removed. The mass balance was used to calculate the mass concentration factor MCF (feed mass/retentate mass). The dye content of the feed, of the retentate and of the permeate was determined via a spectral analysis. The chloride content and also the acetate and formate contents were determined by titration. From the analytical results, the respective averaged membrane retentions were determined as described in the current literature (for example M. Cheryan, Ultrafiltration Handbook, 1986). Permeate flux is obtained from the time course of permeate weight and free membrane surface area.

Nanofiltration Example 1

The stirred pressure cell described under A was equipped with a ceramic NF membrane (pore diameter 0.9 nm, $TiO_2$ separating layer, from Inocermic). Transmembrane pressure in this arrangement was 5 bar in all runs.

First, 35 g of a Direct Brown 44 solution from synthesis example 1c) were weighed into the cell and concentrated by an MCF mass concentration factor of 2.13. Spectral analysis and titration respectively gave a dye retention of 97.9% and a chloride retention of −8.3%. Average permeate flux was 20.7 $kg/m^2h$.

Then 34.9 g of a vesuvin solution from synthesis example 3a) were weighed into the same arrangement and concentrated by an MCF of 2.54. Spectral analysis showed dye retention to be 98.4%. Titration showed formate retention to be 32.2% and acetate retention 20.3%. Average permeate flux was 9.1 $kg/m^2h$.

The cell was subsequently refilled with 34 g of the Direct Brown 44 solution from synthesis example 1c) and concentrated by an MCF of 2.08. Retentions were determined to be 98.2% and −5.0% for dye and chloride respectively. Average permeate flux was 20.2 $kg/m^2h$.

Both the dye solutions were readily nanofilterable. It was observed that membrane permeability remained good despite switching between cationic and anionic dye. The membrane is very useful not only for anionic direct dyes but also for cationic dyes.

Nanofiltration Example 2

The stirred pressure cell described under A was equipped with a polymeric NF membrane (Desal 5 DK from Osmonics). Transmembrane pressure in this arrangement was 5 bar in all runs.

First, 32.6 g of a dye solution from synthesis example 1c) were weighed into the cell and concentrated by an MCF mass concentration factor of 2.06. Spectral analysis and titration respectively gave a dye retention of 99.3% and a chloride retention of 48.3%. Average permeate flux was 14.8 $kg/m^2h$.

Then 32.6 g of a vesuvin solution from synthesis example 3c) were weighed into the same arrangement and concentrated by an MCF of 2.14. Spectral analysis showed dye retention to be 99.8%. Titration showed formate retention to be 51.5% and acetate retention 20.3%. Average permeate flux was 7.6 $kg/m^2h$.

The cell was subsequently refilled with 31.6 g of the dye solution from synthesis example 1c), which were concentrated by an MCF of 2.03. Retentions were determined to be 99.3% and 57.1% for dye and chloride respectively. Average permeate flux was 10.6 $kg/m^2h$.

Nanofiltration Example 3

The stirred pressure cell described under A was equipped with a ceramic NF membrane (NF 7450, from Nitto). Trans membrane pressure in this arrangement was 5 bar in all runs.

First, 33.7 g of a dye solution from synthesis example 1c) were weighed into the cell and concentrated by an MCF mass concentration factor of 2.08. Spectral analysis and titration respectively gave a dye retention of 99.1% and a chloride retention of 17.3%. Average permeate flux was 18.2 $kg/m^2h$.

Then 32.7 g of the from synthesis example 3a) were weighed into the same arrangement. Permeate flux was observed to be <1 $kg/m^2h$ under identical experimental conditions.

This result shows that the membrane, although very suitable for the nanofiltration of sulfonated azo dye, is not suitable for switching between differently charged dyes.

General Prescription for Nanofiltration B

Nanofiltration examples 4-6 were carried out in a cross-flow filtration apparatus which can accommodate not only ceramic single- and multi-channel elements but also polymeric wound modules. The requisite cross flow and operating pressures were produced by a piston diaphragm pump. A pressure-maintaining valve downstream of the membrane module was used to adjust transmembrane pressure. The retentate was recycled back into the reservoir container. In diafiltration operation removed permeate was replaced by continuous, level-regulated addition of diafiltration medium into the reservoir vessel. Diafiltration was characterized by the mass exchange factor MEF=(mass of removed permeate)/(retentate mass at start).

Nanofitration Example 4

Concentration+Diafiltration

A multi-channel element of a ceramic NF membrane (0.9 nm, $TiO_2$, from Inocermic) having 19 channels 3.5 mm internal diameter was installed in the experimental plant described under B. 4.5 kg of the dye solution obtained as per synthesis example 2c) were weighed in and then initially concentrated. Transmembrane pressure was 25 bar and the temperature was 60° C. Flow through the channels had a velocity of about 1.4 m/s. Depending on the permeate quantity removed (MCF=3.02), the following averaged retentions and average permeate fluxes were determined:

|      | Retention % | | Permeate flux |
| --- | --- | --- | --- |
| MCF  | Dye  | Chloride | in $kg/m^2h$ |
| 3.02 | 98.3 | −10.2 | 30.6 |

Then 1.43 kg of the resulting concentrate were diafiltered under the same experimental conditions using dilute ammoniacal water (pH=9.5) as diafiltration medium. Depending on the permeate quantity removed (MCF=2.05), the following averaged retentions and average permeate fluxes were determined:

|      | Retention % | | Permeate flux |
| --- | --- | --- | --- |
| MCF  | Dye  | Chloride | in $kg/m^2h$ |
| 2.05 | 98.9 | −31.0 | 32.3 |

The diafiltration retentate obtained was finally concentrated to the end concentration of the dye. Depending on the permeate quantity removed (MCF=1.98), the following retentions and average permeate fluxes were determined:

| | Retention % | | Permeate flux |
|---|---|---|---|
| MCF | Dye | Chloride | in kg/m²h |
| 1.96 | 99.0 | −57.2 | 20.1 |

The solution obtained as desalted concentrate has a chloride content of 0.12 g NaCl/100 g and a dye content of 23.7% by weight.

Nanofiltration Example 5

Diafiltration+Concentration 5 kg of a solution of the dye solution obtained as per synthesis example 2c) were weighed into the experimental plant described in B and equipped with the same membranes and subsequently initially diafiltered with dilute ammoniacal water (pH=9.5) as diafiltration medium. Transmembrane pressure was 25 bar and the temperature was 60° C. Flow through the channels had a velocity of about 1.4 m/s. Depending on the permeate quantity removed (MCF=2.02), the following averaged retentions and average permeate fluxes were determined:

| | Retention % | | Permeate flux |
|---|---|---|---|
| MCF | Dye | Chloride | in kg/m²h |
| 2.02 | 98.3 | 1.9 | 126.6 |

The diafiltered retentate obtained was subsequently concentrated under the same experimental conditions. Depending on the permeate quantity removed (MCF=6.211) the following retentions and permeate fluxes were determined:

| | Retention % | | Permeate flux |
|---|---|---|---|
| MCF | Dye | Chloride | in kg/m²h |
| 6.21 | 99.2 | −30.5 | 52.3 |

The solution obtained as desalted concentrate has a chloride content of 0.24 g NaCl/100 g and a dye content of 24.8% by weight.

Nanofiltration Example 6

A wound module having a polymeric NF membrane (Desal 5 DK, from Osmonics) was installed for cross-flow filtration in the experimental plant described under B, 17 kg of an as-synthesized solution of the dye solution obtained as per synthesis example 1c) were weighed in and then initially diafiltered with dilute ammoniacal water (pH=9.5) as diafiltration medium. Transmembrane pressure was 30 bar and the temperature was 40° C. Depending on the permeate quantity removed (MCF=3.9), the following averaged retentions and average permeate fluxes were determined:

| | Retention % | | Permeate flux |
|---|---|---|---|
| MCF | Dye | Chloride | in kg/m²h |
| 3.9 | 99.2 | 64.3 | 42.1 |

The diafiltered retentate obtained was subsequently concentrated under the same experimental conditions. Depending on the permeate quantity removed (MCF=7.4), the following retentions and average permeate fluxes were determined:

| | Retention % | | Permeate flux |
|---|---|---|---|
| MCF | Dye | Chloride | in kg/m²h |
| 7.4 | 89.8 | 10.5 | 14.6 |

The solution obtained as desalted concentrate has a chloride content of 0.92 g NaCl/100 g and a dye content of 24.6% by weight.

We claim:

1. A process for producing a liquid formulation of salts of sulfonated azo dyes, which process comprises:
    (a) forming an azo dye by coupling at least an equimolar amount of diazotized aminoarylsulfonic acids of the formula I

$$H_2N\text{—}Ar\text{—}SO_3H \quad (I),$$

wherein Ar is phenylene, which may be monosubstituted by sulfo, or naphthylene, which may be mono- or disubstituted by sulfo and/or monosubstituted by hydroxyl, onto the coupling product of an unsubstituted or methyl-substituted phenylenediamine coupled with itself;
    (b) dissolving the azo dye in a basic medium; and then
    (c) subjecting the solution to a nanofiltration;
wherein the process for producing the liquid formulation avoids isolation of the dye as a solid and the liquid formulation produced has an inorganic salt content of less than 2% by weight based on 100% pure dye.

2. The process for producing a liquid formulation according to claim 1 wherein the dye is dissolved with aqueous sodium hydroxide solution and a nitrogenous base.

3. The process for producing a liquid formulation according to claim 1 wherein the dye is dissolved with aqueous sodium hydroxide solution and ammoniacal water.

4. The process for producing a liquid formulation according to claim 2 wherein the molar ratio of aqueous sodium hydroxide solution/nitrogenous base is in the range from 1/19 to 19/1.

5. The process for producing a liquid formulation according to claim 1 wherein the dye is dissolved by adjusting the pH of the reaction mixture to a value in the range from 8.5 to 11.

6. The process for producing a liquid formulation according to claim 1 wherein the solution is subjected to nanofiltration employing a nanofiltration membrane having ceramic separating layers.

7. The process for producing a liquid formulation according to claim 1 wherein the dye is dissolved with aqueous sodium hydroxide solution and a nitrogenous base and the pH is kept constant with the nitrogenous base during nanofiltration.

8. The process for producing a liquid formulation according to claim 1 wherein the azo dyes are prepared starting from o-, m- and/or p-aminobenzenesulfonic acid diazo component.

9. The process for producing a liquid formulation according to claim 1 wherein the unsubstituted or methyl-substituted coupling product of a phenylenediamine with itself and diazo component I are used in a stoichiometric ratio in the range from 1:1 to 1:4.

10. A process for producing a liquid formulation of salts of sulfonated azo dyes comprising:
   a) preparing a coupling product of an unsubstituted or methyl-substituted phenylenediamine coupled with itself;
   b) without intervening isolation of this coupling product, coupling at least an equimolar amount of diazotized aminoarylsulfonic acids of the formula I

H$_2$N—Ar—SO$_3$H         (I), wherein Ar is phenylene, which may be monosubstituted by sulfo, or naphthylene, which may be mono- or disubstituted by sulfo and/or monosubstituted by hydroxyl, onto the coupling product obtained according to a), to form a dye;
   c) dissolving the dye in a basic medium; and
   d) subjecting the solution obtained according to c) to nanofiltration;
wherein the process for producing the liquid formulation avoids isolation of the dye as a solid and the liquid formulation produced has an inorganic salt content of less than 2% by weight based on 100% pure dye.

11. The process for producing a liquid formulation according to claim 1, wherein the dye is dissolved in the basic medium to produce a solution with a dye content in the range from 3% to 10% by weight.

12. The process for producing a liquid formulation according to claim 10, wherein the dye is dissolved in the basic medium to produce a solution with a dye content in the range from 3% to 10% by weight.

13. The process for producing a liquid formulation according to claim 1, wherein the dye is dissolved in the basic medium to produce a solution with a dye content in the range from 3% to 6% by weight.

14. The process for producing a liquid formulation according to claim 10, wherein the dye is dissolved in the basic medium to produce a solution with a dye content in the range from 3% to 6% by weight.

15. The process for producing a liquid formulation according to claim 1, wherein the liquid formulation produced has a NaCl content of less than 2% by weight based on 100% pure dye.

16. The process for producing a liquid formulation according to claim 10, wherein the liquid formulation produced has a NaCl content of less than 2% by weight based on 100% pure dye.

17. The process for producing a liquid formulation according to claim 1, wherein the solution is subjected to nanofiltration employing a nanofiltration membrane having molecular weight cutoffs of 200 to 2000 daltons, a transmembrane pressure ranging from 1 to 50 bar, and a temperature up to 100° C.

18. The process for producing a liquid formulation according to claim 10, wherein the solution is subjected to nanofiltration employing a nanofiltration membrane having molecular weight cutoffs of 200 to 2000 daltons, a transmembrane pressure ranging from 1 to 50 bar, and a temperature up to 100° C.

* * * * *